United States Patent Office 3,462,511
Patented Aug. 19, 1969

3,462,511
SEPARATION OF p-XYLENE FROM A $C_8$ AROMATIC HYDROCARBON MIXTURE BY CRYSTALLIZATION
Robert R. Edison, Olympia Fields, Ill., assignor to Sinclair Research, Inc., New York, N.Y., a corporation of Delaware
No Drawing. Filed May 22, 1967, Ser. No. 640,417
Int. Cl. C07c 15/08, 7/14
U.S. Cl. 260—674    8 Claims

ABSTRACT OF THE DISCLOSURE

Paraxylene of at least 94 mol percent purity is separated from a $C_8$ aromatic hydrocarbon mixture by cooling the mixture (e.g., to a temperature of below about −60 to −100° F.) in a crystallization zone to crystallize substantially only paraxylene, separating the paraxylene crystals as a cake and washing the separated cake with toluene (e.g., in an amount of about 0.5 to about 10 parts of toluene per part of liquid occluded in the separated cake), recycling toluene-containing effluent from the wash operation to the crystallization zone, melting the washed cake and removing toluene.

---

The invention relates to the separation of paraxylene from a hydrocarbon mixture. More particularly, this invention is directed to the separation of paraxylene having a mol percent purity of at least 94% and in good yield from close-boiling $C_8$ isomers including metaxylene.

Separation of paraxylene from its $C_8$ isomers, especially metaxylene, by distillation is generally impractical or uneconomical because of the close proximity of their boiling points. Since para-xylene and its isomers reportedly form an eutectic mixture at a certain temperature, crystallization processes have been developed to avert the formation of an eutectic mixture of the paraxylene and its isomers by cooling the mixture just short of the point where the first eutectic of paraxylene and its accompanying compounds is formed.

Heretofore, it has been difficult to produce on a commerical scale, paraxylene of at least 94 mol percent purity in a single crystallization. Where paraxylene of 94 mol percent or better purity has been desired, it has generally been necessary to recrystallize the product in a stage crystallization or purification. Various attempts at producing the high purity paraxylene product in a single stage of crystallization, for example, by merely increasing centrifuge time in instances where the paraxylene crystals are separated by centrifugation have to date been unsuccessful. Attainment of high purity paraxylene product may be achieved by washing the separated paraxylene with a suitable wash medium; however, such a method often has the attendant disadvantage of substantial loss in paraxylene product recovery. A process has now been discovered by which in a single stage of crystallization paraxylene of at least 94 mol percent purity can be separated without substantial loss in product recovery from $C_8$ aromatic hydrocarbon containing paraxylene in admixture with other $C_8$ xylene isomers, especially metaxylene. The advantages of such a crystallization process are self-evident.

In accordance with the process of the present invention a paraxylene-containing $C_8$ aromatic hydrocarbon feed is cooled in a crystallization zone to a temperature at which essentially only the desired paraxylene is crystallized without its accompanying isomers being crystallized. The crystals are separated as a cake from the bulk of the mother liquor as by centrifugation which cake usually occludes at least about 10% up to a maximum of about 30% by weight of mother liquor. The crystal cake thus obtained is then washed with toluene in an amount sufficient to provide toluene in the resulting wash effluent which is recycled to the crystallization zone. The washed cake is subjected to, for example, fractional distillation to remove toluene and provide a paraxylene product of at least 94 mol percent purity. The product may be further purified by any desired means, for example, additional crystallizations.

Unlike other wash operations employing paraxylene as a wash medium, the wash operation employing toluene in the present invention presents no plugging problems created by crystallization of the wash medium at the second stage cake temperature. Also the wash operation employing toluene is highly efficient in displacing occluded liquid from the second stage cake. Further, recycling the wash effluent containing toluene to the crystallization zone lowers the eutectic temperature, which is discussed below, of the paraxylene-containing $C_8$ aromatic hydrocarbon feed, permitting an increase in the amount of paraxylene crystallized and an increase in paraxylene product recovery.

The temperature to which the $C_8$ aromatic hydrocarbon feed is cooled is one at which essentially only the desired paraxylene is crystallized without its accompanying isomers being crystallized. As a general rule, the aromatic hydrocarbon feed is cooled down to the eutectic temperature, or somewhat higher, of the paraxylene and the first eutectic-forming compound in the mixture, in other words, not below the temperature at which a component other than the desired paraxylene would be solidified. The temperature is dependent upon the particular feed, for instance, amount and nature of the other hydrocarbons or diluents which may be present in the hydrocarbon feed but simple routine cooling tests or analyses on any particular feed are sufficient for determining the temperature to which an initial charge should be cooled to obtain the crystallization of paraxylene without appreciable amounts of eutectics or other components. Ordinarily, the cooling temperature is about −60 to about −100° F.

In obtaining paraxylene crystals from the mother liquor, the separation, e.g., centrifugation, is conducted under conditions that provide a paraxylene cake having a wetness, that is, a residual or occluded liquid content no greater than about 30, preferably about 10 to 20%, by weight. Depending upon the composition of the $C_8$ aromatic feed, the occluded liquid will usually contain about 7 to 13% by weight paraxylene. Advantageously, the centrifugation is conducted until "equilibrium wetness," is reached, that is, the point at which further significant amounts of liquid cannot be removed from the cake by the given centrifugal force employed, which in most cases places the occluded liquid content within the preferred range recited above. Thus, the centrifuge is run at a rate sufficient to impose a centrifugal force adequate for giving a crystal cake of the desired solids content, within a short period of time. Usually a rate that provides a centrifugal force in the range of about 400 to 1000 times gravity is sufficient. The centrifugation time will vary depending upon the centrifugal force imposed but in most instances falls in the range of at least 10 seconds usually up to about 60 seconds.

The crystal cake thus obtained is then washed with toluene which may be at a temperature of from about the temperature of the cake or lower to about 110° F. The lower wash temperature may reduce paraxylene loss to the wash liquid but has the attendant disadvantage of increasing cooling costs. Temperatures of the order of about 0 to 10° F. have been found to be especially useful when large amounts of toluene are employed. As aforementioned, the amount of toluene employed to wash the paraxylene cake is that sufficient to provide toluene in the wash effluent which lowers the eutectic temperature of the $C_8$ aromatic hydrocarbon mixture in the crystallization zone. Increasing the amount of toluene wash, and thus the amount of toluene in the wash effluent, causes greater reduction of the eutectic temperature of the mixture in the crystallization zone and consequently greater amounts of paraxylene crystallized and recovered. However, since the amount of toluene employed may also increase the volume of material to be processed, the use of overly large amounts of toluene may be impractical. Moreover, the use of overly large amounts of toluene may further cause undue dissolution of paraxylene cake. Often the eutectic temperature of the mixture in the crystallization zone is lowered by at least 1° F., and the amount of toluene wash usually employed is about 0.5 to about 10 moles of toluene per mole of occluded cake liquid, preferably about 0.75 to 5 moles per mole of occluded cake liquor.

The actual wash operation can be conveniently conducted in the same centrifuge and conditions as used to effect the separation of the paraxylene crystal from the mother liquor by simply equipping the centrifuge with means for introducing the toluene wash liquid. Upon completion of the toluene wash, the resulting toluene-containing cake can be melted and subjected to, for example, fractional distillation to remove the toluene overhead and provide a final paraxylene product having a purity of at least 94 mol percent.

Suitable crystallization feeds for the paraxylene recovery process of the present invention are, for example, $C_8$ hydrocarbon fractions, boiling in the range of about 250 to 295° F. and predominating in $C_8$ aromatics, which contain at least about 5% by weight paraxylene, preferably at least about 8%. Typical feeds contain about 10 to 50% or more of the desired product. Commonly a $C_8$ feed contains about 5 to 30% paraxylene and includes in admixture one or more of the other xylenes, e.g. about 5 to 70% metaxylene, about 5 to 30% orthoxylene, and a minor amount of ethylbenzene. Minor amounts of paraffins and other aromatics may be also present.

The following examples are included to further describe the present invention but are not to be considered limiting.

EXAMPLE I 100 moles per minute of a $C_8$ aromatic hydrocarbon fraction boiling in the range of about 275–295° F. containing 20 mol percent paraxylene, 10 mol percent orthoxylene, 60 mol percent metaxylene and 10 mol percent ethylbenzene is charged to a crystallization unit, and cooled to −79.2° F., which is the eutectic temperature, in a crystallizer. The resulting slurry is then transferred to a centrifuge where a yield of 12.49 moles per minute of impure cake is separated from the mother liquor by centrifugal filtration. The mother liquor (87.51 moles per minute) is withdrawn from the centrifuge and yielded as filtrate product. The cake, which accumulated on the centrifuge basket screen, occludes mother liquor to the extent that the cake consisted of 87% solids and 13% liquid.

The solids portion of the cake is 100% paraxylene. The occluded liquid has the same composition as filtrate, i.e., 10.25 mol percent paraxylene. Of the total 12.49 mols per minute of cake yielded, 11.03 mols or 88.3% is paraxylene.

EXAMPLE II 100 moles per minute of the $C_8$ aromatic hydrocarbon fraction employed in Example I is charged to a crystallization unit, and cooled to about −79.2° F. in a crystallizer. The resulting slurry is then transferred to a centrifuge where a yield of impure cake is separated from the mother liquor by centrifugal filtration. The mother liquor (87.08 mols per minute) is withdrawn from the centrifuge and yielded as filtrate product. The cake, which accumulated on the centrifuge basket screen, occludes mother liquor to the extent that the cake consisted of 84% solids and 16% liquid. The solids portion of the cake is 100% paraxylene. The occluded liquid has the same composition as filtrate, i.e., 10.25% paraxylene.

The resulting cake is then washed in the centrifuge with toluene at a temperature of 9° F., and the wash effluent (5.74 mols per minute) removed by centrifugation. The amount of toluene employed was about 2.43 mols of toluene per mole of occluded cake liquid. The washed cake (12.18 mols per minute) is melted and subjected to fractional distillation to remove the toluene and obtain 10.43 moles per minute of product of which 10.27 moles or 98.5% is paraxylene.

EXAMPLE III fraction employed in Example I is joined with 5.9 moles per minute of recycled wash effluent and charged to a crystallization unit, and cooled to about −81.3° F., which is the eutectic temperature, in a crystallizer. The resulting slurry is then transferred to a centrifuge where a yield of impure cake is separated from the mother liquor by centrifugal filtration. The mother liquor (92.16 mols) is withdrawn from the centrifuge and yielded as filtrate product. The cake, which accumulated on the centrifuge basket screen, occludes mother liquor to the extent that the cake consisted of 84% solids and 16% liquid. The solids portion of the cake is 100% paraxylene. The occluded liquid has the same composition as filtrate, i.e., 9.83% paraxylene.

The resulting cake is then washed in the centrifuge with toluene at a temperature of 9° F., and the wash effluent removed by centrifugation and joined with the feed to the crystallizer. The amount of toluene employed was about 2.26 mols of toluene per mole of occluded cake liquid. Following the wash the cake is melted and subjected to fractional distillation to remove the toluene and obtain 11.09 moles of product of which 10.94 mols or 98.6% is paraxylene.

The examples clearly demonstrate the superiority of the method of the invention in obtaining a high purity paraxylene product in good yield. In the method of Example I wherein no toluene wash is employed, the amount of paraxylene recovered is high but the purity of the product is only 88.3%. Washing the impure separated cake with toluene as in Example II increases the purity of the paraxylene product but a substantial reduction in the amount of paraxylene recovered, as compared with the amount recovered in Example I, is realized. In Example III, which ilustrates the method of the invention, high purity paraxylene is produced without substantial reduction in product recovery.

It is claimed:

1. A method for the separation of paraxylene of at least 94 mol percent purity from an aromatic hydrocarbon predominating in $C_8$ aromatics, including metaxylene, and containing about 5 to 50% paraxylene, which comprises cooling the hydrocarbon in a crystallization zone to crystallize substantially only paraxylene, separating paraxylene crystals as a cake from the bulk of the mother liquor by centrifugation, washing the separated cake with toluene in an amount sufficient to provide toluene in the wash effluent, and recycling said effluent to said crystallization zone to lower the eutectic temperature of said aromatic hydrocarbon in said crystallization zone.

2. The method of claim 1 wherein the amount of toluene employed is sufficient to lower said eutectic temperature by at least 1° F.

3. The method of claim 2 wherein the amount of toluene employed is about 0.5 to about 10 mols of toluene per mol of liquid occuluded in the separated cake.

4. The method of claim 1 wherein the temperature of the toluene is from about the temperature of said cake to about 110° F.

5. The method of claim 3 wherein the aromatic hydrocarbon fraction contains about 8 to 30% paraxylene.

6. A method for the separation of paraxylene of at least 94 mol percent from a $C_8$ aromatic hydrocarbon feed containing about 8 to 30% paraxylene in admixture with other $C_8$ xylene isomers and ethylbenzene, comprising cooling the feed in a crystallization zone to crystallize substantially only paraxylene, separating paraxylene crystals as a cake from the bulk of the mother liquor by centrifugation to separate a cake of paraxylene crystals containing a maximum of about 30 weight percent occuluded liquid and washing the separated cake with about 0.75 to about 5 moles of toluene per mole of occluded liquid and recycling the effluent containing toluene from said washing to said crystallization zone.

7. The method of claim 6 wherein the cooling operation is conducted at a temperature of below about $-60°$ F. to about $-100°$ F.

8. The method of claim 7 wherein the separated cake of paraxylene contains about 10 to 20 weight percent occluded liquid.

References Cited

UNITED STATES PATENTS 2,795,634   6/1957   Hoff et al. _____ 260—674

FOREIGN PATENTS 571,632   3/1959   Canada.
949,161   2/1964   Great Britain.

DELBERT E. GANTZ, Primary Examiner

C. R. DAVIS, Assistant Examiner

PO-1050
(5/69)

UNITED STATES PATENT OFFICE
CERTIFICATE OF CORRECTION

Patent No. 3,462,511      Dated August 19, 1969

Inventor(s) Robert R. Edison

It is certified that error appears in the above-identified patent and that said Letters Patent are hereby corrected as shown below:

Column 4, Line 15, immediately below Example III, insert

--100 moles per minute of the $C_8$ aromatic hydrocarbon--

SIGNED AND
SEALED
FEB 17 1970

(SEAL)
Attest:

Edward M. Fletcher, Jr.
Attesting Officer

WILLIAM E. SCHUYLER, JR.
Commissioner of Patents